(12) United States Patent
Reuter et al.

(10) Patent No.: US 7,051,122 B2
(45) Date of Patent: May 23, 2006

(54) STRUCTURE AND PROCESS FOR DISTRIBUTING SCSI LUN SEMANTICS ACROSS PARALLEL DISTRIBUTED COMPONENTS

(75) Inventors: James M. Reuter, Colorado Springs, CO (US); Andrew C. St. Martin, Woodland Park, CO (US); Richard F. Wrenn, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/888,156

(22) Filed: Jul. 9, 2004

(65) Prior Publication Data

US 2005/0055468 A1    Mar. 10, 2005

Related U.S. Application Data

(63) Continuation of application No. 09/872,971, filed on Jun. 1, 2001, now Pat. No. 6,772,231.

(60) Provisional application No. 60/208,971, filed on Jun. 2, 2000.

(51) Int. Cl.
*G06F 3/00* (2006.01)
(52) U.S. Cl. ............... 710/5; 710/12; 710/15; 717/169; 717/170; 717/171
(58) Field of Classification Search ............ 710/5, 710/12, 15; 717/169, 170, 171, 172, 173
See application file for complete search history.

(56) References Cited

U.S. PATENT DOCUMENTS 5,396,626 A * 3/1995 Nguyen ............ 717/171
5,845,154 A   12/1998 Krakirian
5,941,972 A * 8/1999 Hoese et al. ............ 710/315
5,996,024 A   11/1999 Blumenau
6,041,381 A   3/2000 Hoese
6,209,023 B1  3/2001 Dimitroff et al.

(Continued)

OTHER PUBLICATIONS

Montague, Robert M. et al., Virtualizing the SAN, Morgan Keegan & Company, Inc., Jul. 5, 2000, pp. 1-20.

*Primary Examiner*—Kim Huynh
*Assistant Examiner*—Alan S. Chen

(57) ABSTRACT

Briefly, the present invention provides a system and method for distributing SCSI semantics throughout a network. Specifically, the present invention distributes the SCSI semantics through multiple parallel agents and a separate controller. This configuration allows performance-sensitive distribution of SCSI semantics to be parallelized and optimized for performance in the agents, while the control and management of the SCSI semantics is centralized in the controller chosen for optimal cost, management, and other implementation practicalities. In this design, the SCSI semantics are stored in the controller, and portions of the SCSI semantics are distributed to the mapping agents as cached, read-only information. The controller is responsible for persistent storage of the SCSI semantics, thereby consolidating the costs and management for the SCSI semantics in a single component. The agents preferably do not interact with other mapping agents, thereby improving the scalability of virtual storage systems and their tolerance of component failures. Within an embodiment of the SCSI distribution system, key SCSI semantic information is distributed to the agents while infrequently used semantic information is centralized in the controller. Likewise, SCSI commands that cannot be processed by the agents may be forwarded to the controller.

11 Claims, 11 Drawing Sheets

U.S. PATENT DOCUMENTS

| | | | |
|---|---|---|---|
| 6,305,019 B1 * | 10/2001 | Dyer et al. | 725/91 |
| 6,463,504 B1 * | 10/2002 | Ishibashi et al. | 711/114 |
| 6,484,245 B1 * | 11/2002 | Sanada et al. | 711/164 |
| 6,587,950 B1 * | 7/2003 | Shah et al. | 713/300 |
| 6,779,177 B1 * | 8/2004 | Bahrs et al. | 717/173 |
| 6,832,379 B1 * | 12/2004 | Zeryck et al. | 719/327 |

* cited by examiner

STRUCTURE AND PROCESS FOR DISTRIBUTING SCSI LUN SEMANTICS ACROSS PARALLEL DISTRIBUTED COMPONENTS

RELATED APPLICATIONS

This application is a continuation of U.S. application Ser. No. 09/872,971, filed on Jun. 1, 2001 now U.S. Pat. No. 6,772,231, which claims priority from U.S. Provisional Application No. 60/208,971, filed on Jun. 2, 2000, the disclosure of which is hereby incorporated by reference in full.

FIELD OF THE INVENTION

This invention provides a system and process for distributing storage device semantics throughout a virtual storage network.

BACKGROUND OF THE INVENTION

Computer systems using conventional disks and storage subsystems incur substantial system and storage management expenses because of tight coupling between the computer systems and the storage subsystems. Storage virtualization addresses this problem by decoupling computer system management from storage management. Distributed storage virtualization schemes offer further scaling advantages, including the ability to scale to multiple computer systems, multiple storage systems, and large storage networks with adequate performance.

The distributed virtual storage networks generally employ Small Computer System Interface (SCSI) semantics to direct interactions between components in the networks. Currently, the predominant forms of SCSI are termed SCSI-2 and SCSI-3. Among its features, SCSI-2 permits enhanced SCSI device data transfer methodologies while maintaining the asynchronous transfer of data, instructions, and messages from earlier SCSI implementations. Developers have further updated the SCSI-2 standard to produce the SCSI-3 standard. For example, SCSI-3 command protocols do not have dependencies on a physical interconnection medium, allowing the SCSI-3 command operations and data flows over a serial bus such as a Fibre Channel interconnect medium. The use of the SCSI interface is advantageous because numerous communication channels and components are currently adapted for use on a SCSI type network. Another key advantage of using SCSI is that the operating system driver stacks exist almost universally for SCSI devices.

In the SCSI protocols, transactions between the components use SCSI command set semantics. For example, within the SCSI protocol, a sender (i.e., the component that initiates a transaction) is allowed to perform a fixed number of other transfers before the sender stalls waiting for an acknowledgment of the transaction. The full extent of SCSI semantics, also called state, is beyond the scope of this disclosure, but is described in the relevant ANSI/ISO T10 standards (SCSI-3) and X3T9 standards (SCSI-2). In a network having multiple storage containers, the SCSI device and logical unit number (LUN) semantics identify a particular storage device and particular segments in the device, as needed for virtual storage. Similarly, implementing the distributed virtualization storage networks generally necessitates the further distribution of SCSI semantics for the virtual disk.

To avoid the distribution of SCSI semantics, some of the known virtual storage systems use block device semantics in operating system driver stacks, thereby minimizing the need for SCSI behavior. Other known virtual storage systems avoid distributing SCSI input/output (I/O) semantics altogether through the use of centralized SCSI storage devices, designated by LUNS. Alternatively, designers may develop a distributed virtual storage network that operates without using SCSI device semantics to present virtual disks to hosts. This configuration, however, would require inventing a new, presently unknown interface model and implementing this model throughout all of the elements in each supported host system.

So far as it is known, the notion of distributing SCSI device semantics to accompany the distributed table-driven virtual mapping is not provided for by an established or developing storage network. Accordingly, there exists a current need for a solution to distribute SCSI semantics in a virtual storage network.

SUMMARY OF THE INVENTION

Briefly, the present invention provides a system and method for distributing SCSI semantics throughout a virtual storage network. Specifically, the present invention distributes the SCSI semantics through multiple parallel mapping agents and a separate controller. This configuration allows performance-sensitive distribution of SCSI semantics to be parallelized and optimized for performance in the agents. Furthermore, the control and management of the SCSI semantics is centralized in a controller chosen for optimal cost, management, and other implementation practicalities. In this design, the SCSI semantics are stored in the controller, and portions of the SCSI semantics are distributed to the mapping agents as cached, read-only information. By storing most or all of the SCSI semantics in volatile memory residing in the agents, the system substantially reduces the cost and complexity of implementing the SCSI semantic distribution. The controller is responsible for persistent storage of the SCSI semantics, thereby consolidating the costs and management for the SCSI semantics in a single component. The agents preferably interact with only the controller and not with other mapping agents, thereby improving the scalability of virtual storage systems and their tolerance of component failures.

Within a preferred embodiment of the SCSI distribution system, key SCSI semantic information is distributed to the agents while infrequently used semantic information is centralized in the controller. One value of this approach is that SCSI semantics that are complex, but infrequently used, may be centralized in the controller. Likewise, SCSI commands that cannot be processed by the agents are preferably forwarded to the controller.

In another embodiment, the controller sends a intermittent signal to the agents. If one of the agents does not receive the signal, the agent modifies the SCSI semantics to prevent I/O operations to an associated virtual disk.

BRIEF DESCRIPTION OF THE DRAWINGS

These and other advantages of the present invention are more fully described in the following drawings and accompanying text in which like reference numbers represent corresponding elements throughout.

DETAILED DESCRIPTION OF THE PREFERRED EMBODIMENT

Figure 1A:
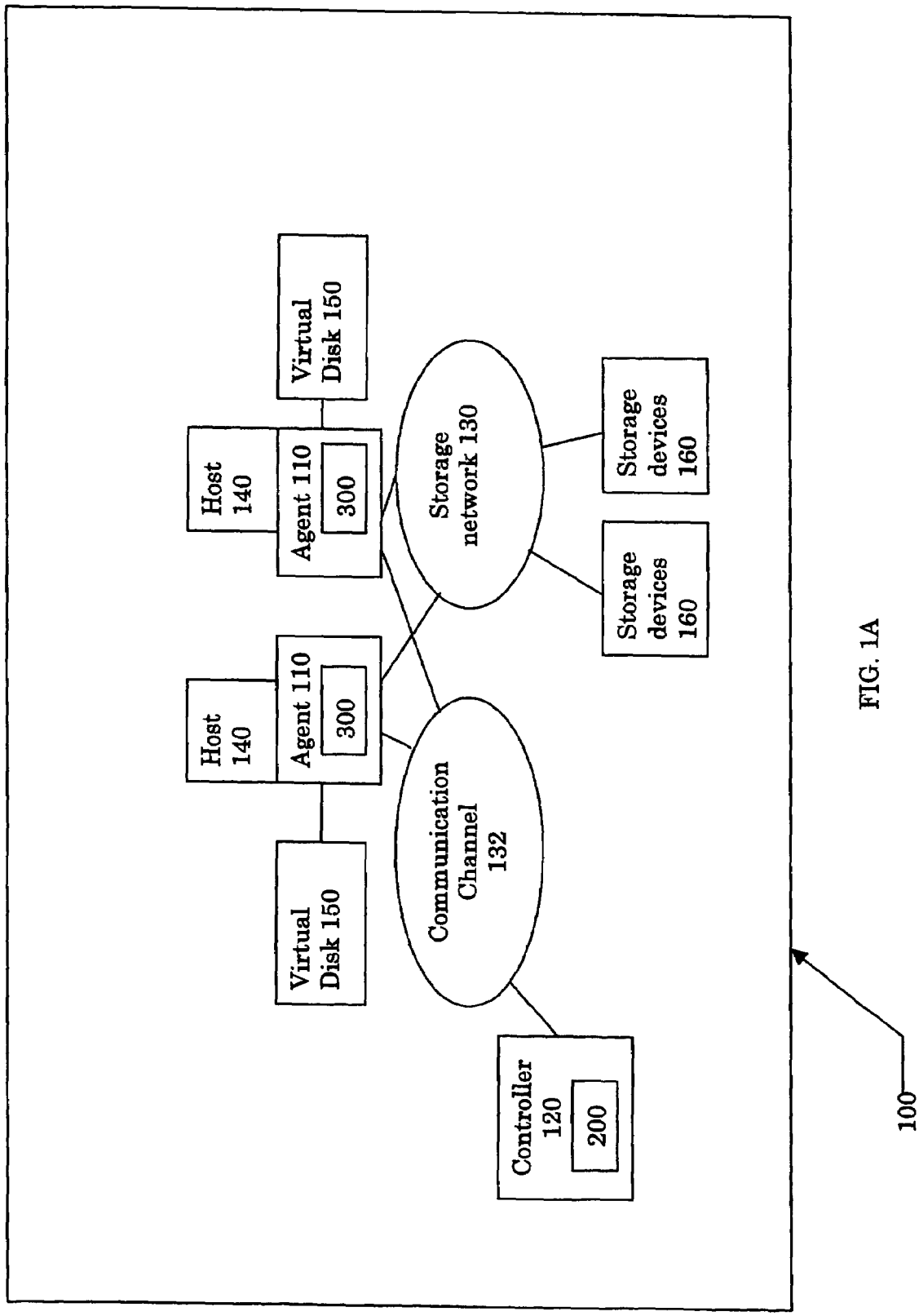
FIGS. 1A–1C are schematic illustrations of a SCSI semantics distribution system in accordance with embodiments of the present invention.
Figure 1B:
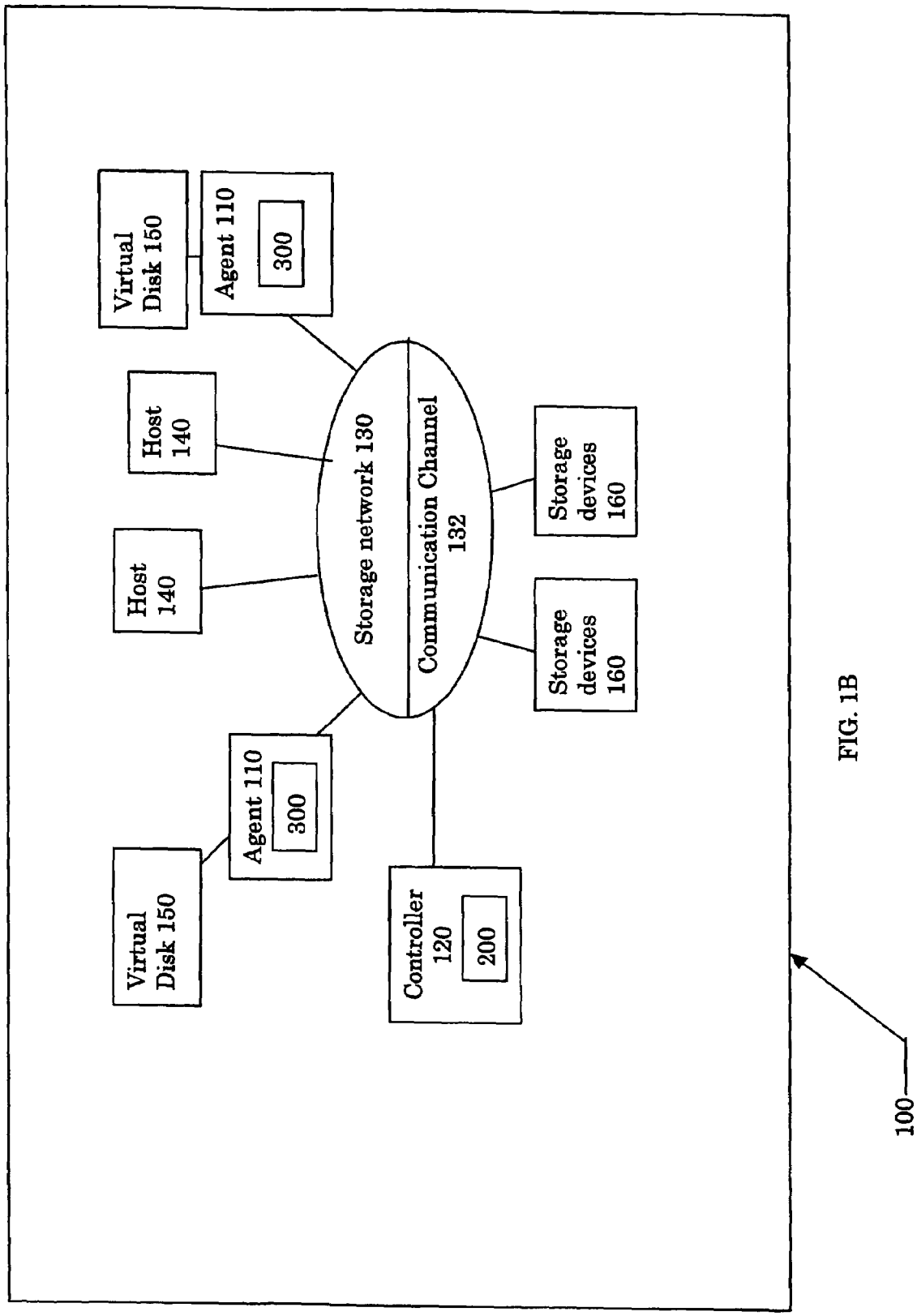
Figure 1C:
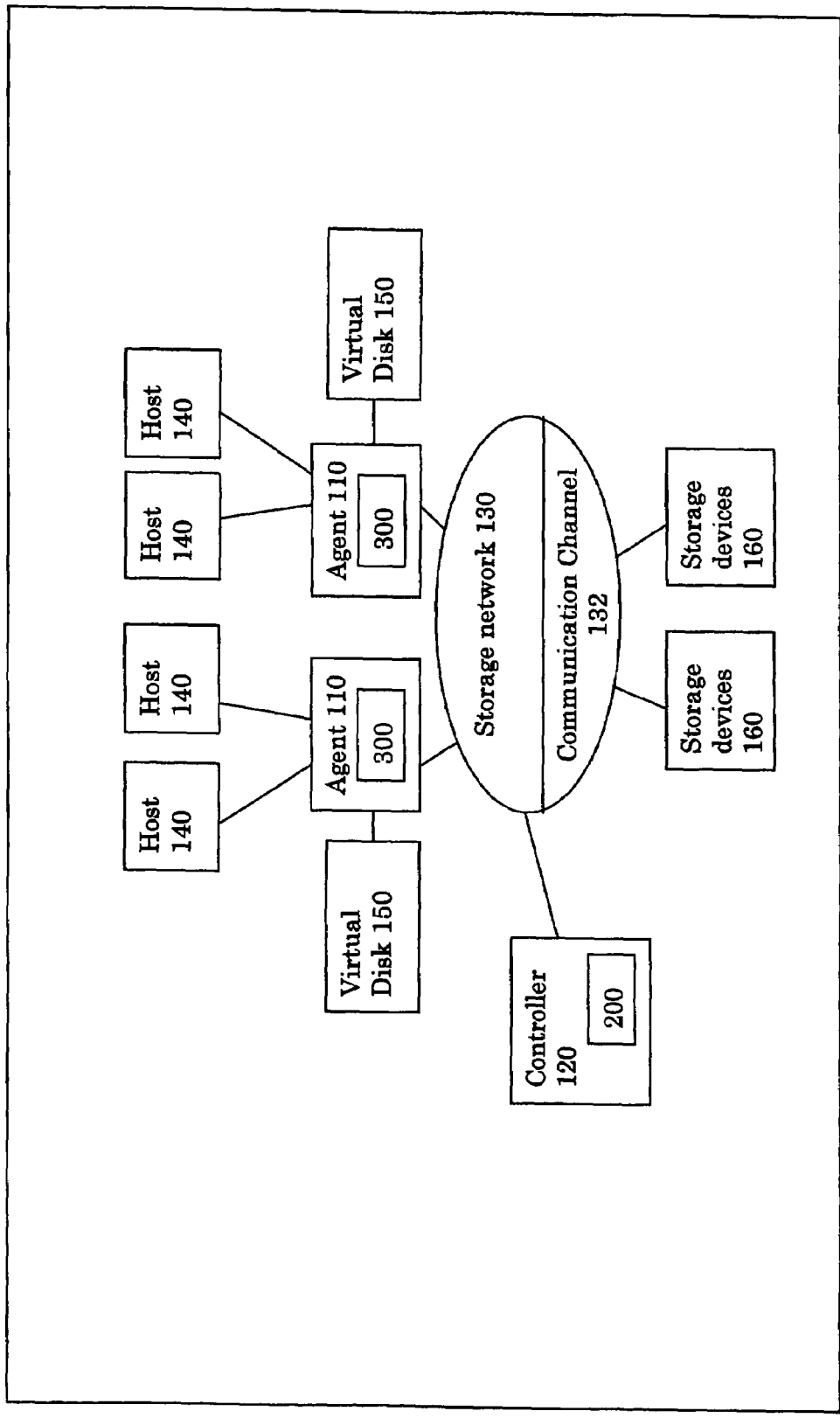

In one embodiment, the present invention provides a SCSI semantic distribution system 100, as illustrated in FIGS. 1A–1C. The system 100 distributes SCSI behavior for virtual disks 150 that are presented to multiple hosts 140 through multiple agents 110 over a storage network 130. This SCSI semantics behavior is fabricated by a controller 120 and is completely independent of the SCSI semantics of the underlying storage containers 160. Within a distributed virtual storage network, with which the system 100 coexists, the host 140 sends an input/output command to a mapping component (not illustrated) that accesses a mapping table relating segments on a virtual disk 150 with locations on the storage containers 160.

It should be appreciated that the present invention relates generally to the controller 120 and the agents 110, and their interaction for the distribution of the SCSI semantics in any computer network. Referring to FIGS. 1A–1C, the storage containers 160 may therefore refer to any type of present or future known programmable digital storage medium, including but not limited to disk drives, tape drives, and writeable optical drives. Similarly, the hosts 140 may be any device, including a computer, display or printer, that connects to a computer network to access data from the virtual disk 150. In the same manner, the storage network 130 is also intended to include any communication technology, either currently known or developed in the future, such as the various implementations of a SCSI channel or Fibre Channel. In one preferred implementation, the system 100 uses Switched Fibre-Channel for the storage network 130.

As depicted in FIGS. 1A–1C, the system 100 uses one or more agents 110 that facilitate data transfers associated with the hosts 140. Specifically, the agents 110 access the SCSI semantics for a virtual disk 150 during an I/O operation involving the hosts 140. The agents 110 either reside on a host 140 as depicted in FIG. 1A, or are coupled to a host via the storage network as depicted in FIG. 1B. In one implementation, the agent 110 is embedded in the host 140 as a backplane card attached to a bus on the host 140. Within the SCSI semantic distribution system 100, each of the agents 110 preferably does not interact with the other agents 110. Overall, the agents 110 allow the performance-sensitive distribution of the SCSI semantics to be parallelized and distributed optimally for performance.

Preferably, each of the hosts 140 has a separate agent 110, but the system 100 could be configured so that more than one host 140 connects to an agent 110, as depicted in FIG. 1C. Because SCSI semantics are associated with each presentation of a virtual disk 150, the hosts 140 may share the SCSI state associated with a virtual disk presentation, or may have independent presentations of the virtual disk 150 through an agent 110, when multiple hosts 140 connect to the same agent 110.

The mapping agent 110 generally stores the SCSI semantics in a volatile memory, such as DRAM. As a result, if one of the agents 110 loses power or fails, that agent 110 loses its copy of the SCSI semantics. In another embodiment, a small portion of the SCSI state is stored in non-volatile memory in the agent 110, and a remaining portion of the SCSI state is stored in volatile memory. This configuration generally allows a faster host boot time and may also help avoid boot-time device timeout problems. By storing most or all of the SCSI semantics in volatile memory on the agents 110, the host 140 may easily and rapidly access the SCSI semantics on the agents 110. Storing most or all of the SCSI semantics in volatile memory has the further advantage of substantially reducing the cost and complexity of implementing the agents 110.

Referring again to FIGS. 1A–1C, the system 100 further comprises a controller 120 that is separate from the mapping agents 110. The controller 120 administers and distributes aspects of the SCSI semantics to the agents 110. Control of the SCSI semantics is centralized in the controller 120 for optimal cost, management, and other implementation practicalities. Furthermore, the controller 120 preferably stores the SCSI semantics in a semi-permanent memory, such as a magnetic disk or an EPROM, so that the controller 120 retains the SCSI semantics even after a power loss. In this way, the responsibility for persistent storage of the SCSI semantics lies in the controller 120, allowing both costs and complexity to be consolidated. It should be appreciated that the exact design of the controller 120 is not a subject of this invention, which focuses instead on structure of the overall system and the interfaces between the agent 110 and the controller 120. Accordingly, any controller, as known in the art of digital information storage, may be employed as needed to implement the present invention. It should be further appreciated that the system 100 may have more than the controller 120.

As described below, the interaction of the controller 120 and the agents 110 is defined in terms of functions and return values. In one embodiment of the SCSI semantics distributed system 100, illustrated in FIG. 1A, communication is implemented over a communication channel 132. In another implementation of the system 100, illustrated in FIGS. 1B–1C, the communication channel 132 is part of the storage network 130. Any suitable technique may be used to translate commands, faults, and responses to network messages over the communication channel. Similarly, the communication channel 132 may employ any type of data transfer protocol, such as TCP/IP, between the controller 120 and the agents 110. The particular interactions between agents 110 and the controller 120 are described in greater detail below.

One design consideration for implementing the above-described system 100 is the selection of the aspects for the SCSI semantics distributed to the agents 110 to facilitate I/O operations to the virtual disk and the aspects for the SCSI semantics to centralize I/O operations at the controller 120 to preserve performance. A second consideration for implementing the above-described system 100 is the design of interfaces for efficient distribution and coordination of SCSI semantics as needed in a distributed, virtual storage network. Accordingly, the following description first addresses the distribution of SCSI semantics and then describes the system interfaces used for control and management of the SCSI semantics.

Distributing the SCSI Semantics

Figure 2:
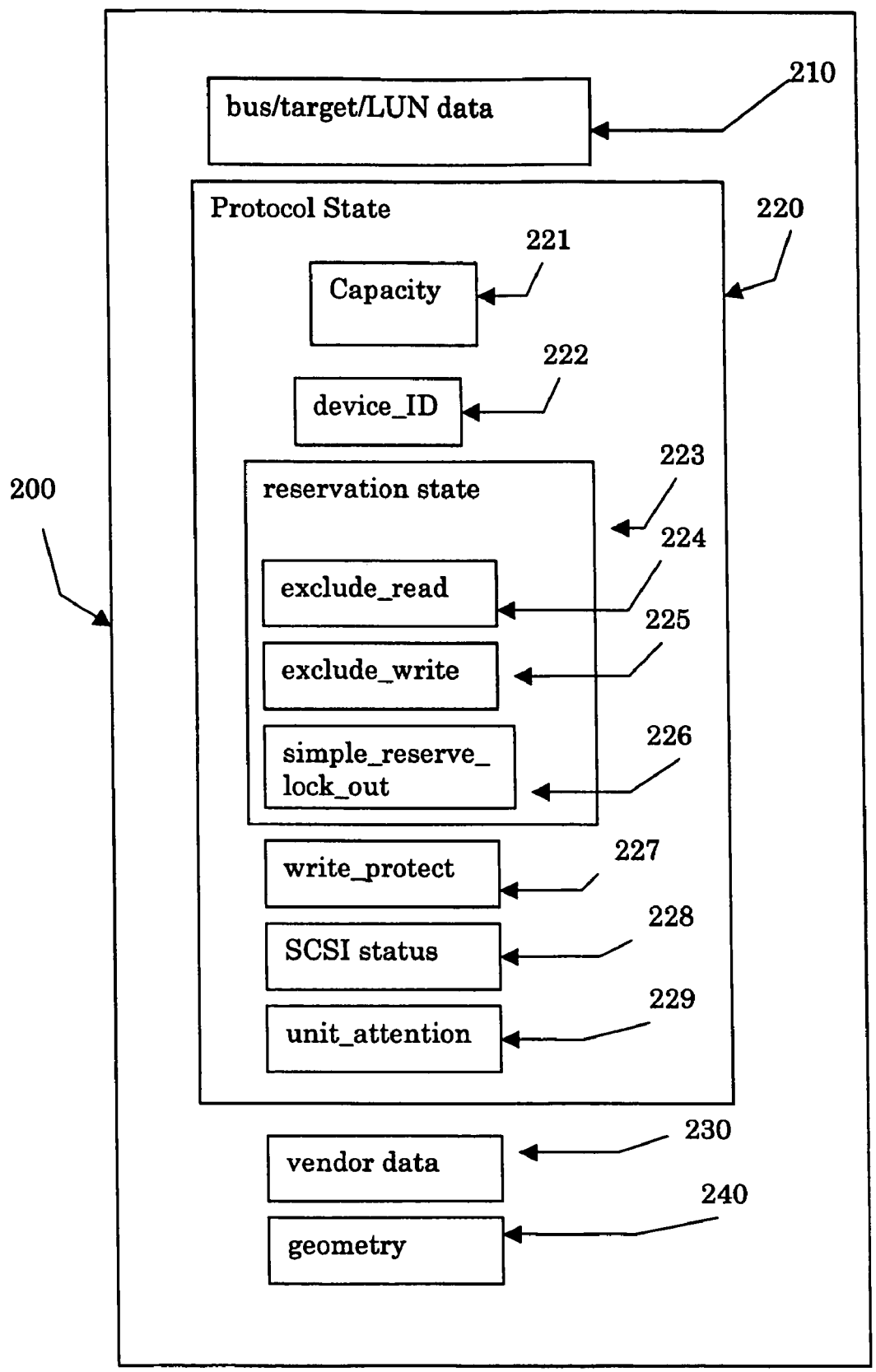
FIG. 2 is an illustration of centrally stored states utilized in the SCSI semantics distribution system of FIGS. 1A–1C, in accordance with a preferred embodiment of the present invention.
Figure 3:
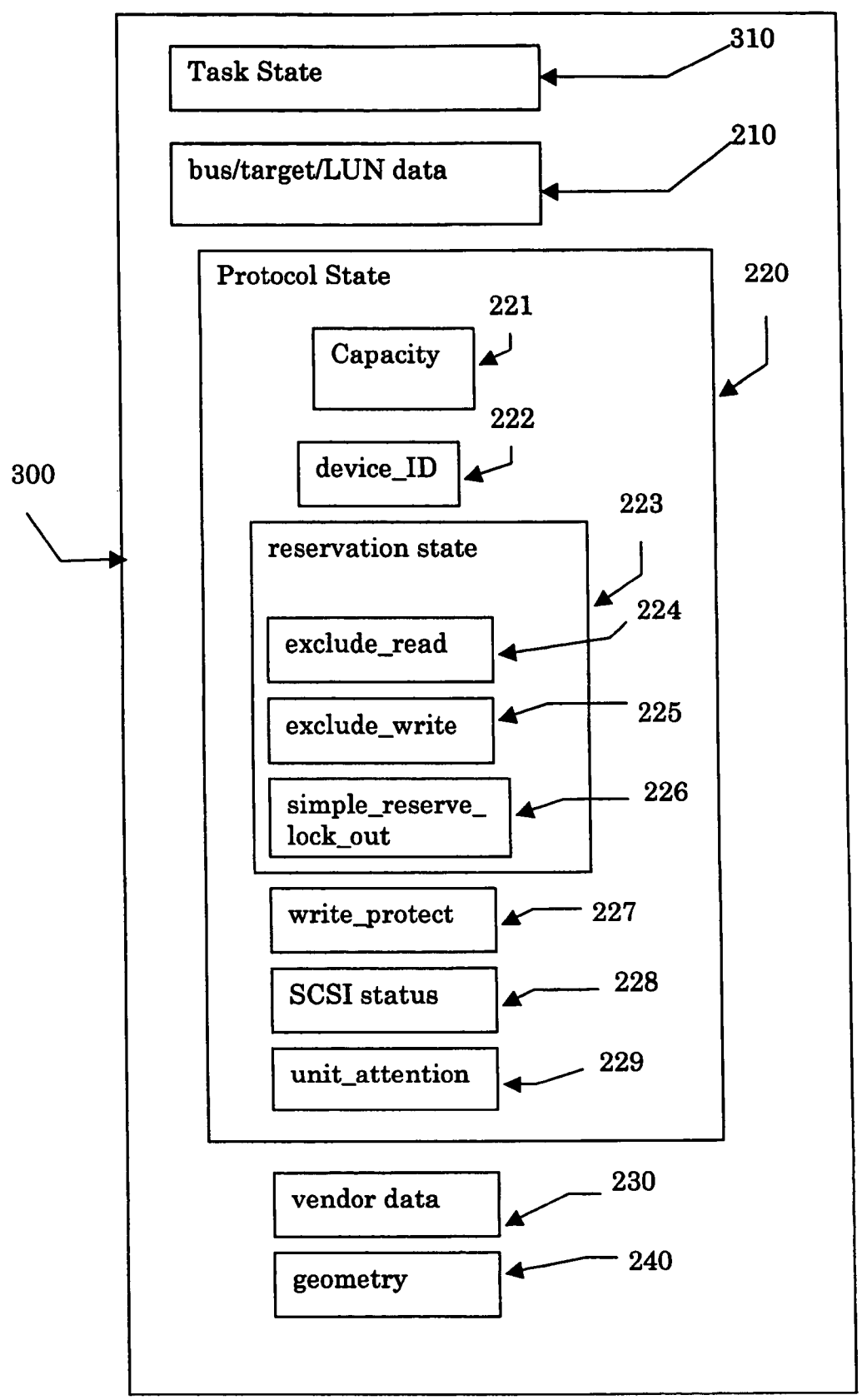
FIG. 3 is a further illustration of distributed states utilized in the SCSI semantics distribution system of FIGS. 1A–1C, in accordance with a preferred embodiment of the present invention.

Referring again, to FIGS. 1A–1C, the system 100 has central SCSI semantics 200 centrally stored in the controller 120 and distributed SCSI semantics 300 stored in the distributed agents 110. In operation, the controller 120 distributes portions of the centralized SCSI semantic 200 to the agents 110, which use this information to form the distributed SCSI semantic 300. The contents of a centralized SCSI semantic 200 and a distributed SCSI semantic 300 are schematically illustrated in FIGS. 2 and 3, respectively, and described in greater detail below.

One facet of the SCSI state is the information relating to the state of SCSI devices. Some portions of the SCSI state, such as information on mode pages, log pages, and inquiry data, are read infrequently and only as needed by certain explicit operations. Conversely, network components typically read other portions of the SCSI state more frequently, e.g., during every I/O operation. Frequently accessed elements of the SCSI state generally include information on device capacity and device reservations. This type of information is generally used to verify, for every I/O operation, that an I/O operation occurs within a block range of the storage device's capacity and that the I/O operation is permitted by the current reservation state of the storage device. Therefore, in a preferred embodiment of the present invention, frequently accessed SCSI state data is stored in the agent 110.

Most aspects of the SCSI state vary infrequently, generally following specific commands or certain task management operations, such as resetting the device. Typically, the only portion of the SCSI state that changes frequently is the task management state, or task state 310. Every SCSI command constitutes a task, and the task state 310 includes a record of all outstanding SCSI commands. The task state further includes task management operations, such as aborting tasks or grouping sets of tasks to be performed concurrently.

Within distributed networks, such as the system 100, each of the hosts 140 performs numerous tasks via the agents 110. In one implementation, the controller 120 centrally coordinates the task state for all hosts 140 and stores the task state in the centralized SCSI semantic 200. However, a preferred embodiment for the system 100 configures each of the agents 110 to contain a separate, independent task state, thereby improving performance over a distributed structure.

Referring to FIG. 3, the task state 310 is stored predominantly in the distributed SCSI semantics 300. Where separate agents 110 share a virtual disk 150 (i.e., share a mapping to the storage container 160), the agents 110 may share a task state 310, so that the agents 110 may coordinate activities and changes to the virtual disk 150. However, the separate task states 310 at each of the agents 110 preferably do not interact because the interaction of the task states 310 at separate agents 110 causes significant performance loss. In particular, the mingling of the task states 310 may require the controller 120 to be potentially involved in every I/O operation to maintain an ordered task set for the system.

Referring to FIGS. 2 and 3, several aspects of the SCSI state are explicitly stored in the mapping agents' distributed SCSI semantic 300 under the management of the controller 120 to provide high performance I/O operations. The elements of the SCSI state stored in the centralized SCSI semantic 200 and distributed SCSI semantic 300 typically include bus/target/LUN data 210, which is a piece of the SCSI state specifying the bus/target/LUN identity of a virtual disk. A LUN designation may identify a virtual disk, a target may identify a group of LUNS, and a bus may identify a group of targets. Because most operating systems have structures representing parallel bus SCSI implementations that are deeply embedded in device driver designs, the virtual disks 150 may be modeled according to the bus/target/LUN data 210.

Again referring to FIGS. 2 and 3, the centralized SCSI semantic 200 and distributed SCSI semantic 300 may further include a protocol state 220. The protocol state 220 is a data structure containing a number of fields used by the host 140 when performing I/O operations to the virtual disk 150. The fields on the protocol state 220 used during I/O operations may include information on the capacity 221, in disk blocks, of a virtual disk 150 and a device_id 222 such as a SCSI-FCP 128 bit device identifier for the virtual disk. The protocol state 220 may further include a reservation_state 223 having three Boolean values representing SCSI reservation and a persistent reservation state. The persistent reservation state may include: an exclude_read Boolean variable 224 that prohibits read operations when activated; an exclude_write Boolean variable 225 that prohibits write operations when activated; and a simple_reserve_lock out state 226 that prohibits I/O operations blocked by a reserve command. The protocol state 220 may further include a Boolean value write_protect 227 that, when active, causes the agent 110 to write protect SCSI semantics on the virtual disk 150. A SCSI status 228 in the protocol state 220 further provides information on the status of various SCSI states such as "active," "quiesced," "disabled," and "not ready" that are used typically in presentations of the virtual disk 150 to the host 140 or to coordinate distributed operations. Another element of the protocol state 220 may be the Boolean value unit_attention 229, which indicates to the agent 110 that the controller 120 has SCSI unit attention information that must be returned for the next I/O operation.

In addition to the above described state information, the centralized SCSI semantic 200 and/or the distributed SCSI semantic 300 may further include some fields that may be controlled by the controller 120 or simply hardwired to the agent 110, with fixed values or values computed algorithmically. For example, the centralized SCSI semantic 200 and the distributed SCSI semantic 300 may have vendor specific inquiry information 230 such as a vendor identifier and other vendor specific information that are set by the controller 120 and added to the SCSI state or hardwired in the agent 110. Likewise, a geometry state 240 providing disk geometry information could be algorithmically computed by the agent 110 from the virtual disk 150 capacity, or the data in the geometry state 240 may be computed by the controller 120 and sent to the mapping agent 110 in the SCSI protocol.

It should be appreciated that numerous other SCSI semantic information may be stored in the centralized SCSI semantic 200 and distributed to the SCSI semantic 300. For example, the various SCSI protocols, such as SCSI-2 and SCSI-3, further specify numerous other operations, states, and information fields that may be easily incorporated into the SCSI distribution system 100. In particular, the SCSI distribution system 100 may be adapted to support and distribute any particular set of SCSI semantics. Overall, the present invention provides a distributed architecture that is able to distribute interfaces as needed for the distribution of key SCSI state data to the agents 110 and the centralization of infrequently used states to the controller 120. In this way, SCSI semantics that are complex, but infrequently used may be centralized in the controller 120. Similarly, within the system 100, SCSI commands that cannot be processed by the agent 110 are forwarded to the controller 120 for processing.

Command/Response Operations

The system 100 further includes a set of operations used to manage and coordinate the SCSI state data between the controller 120 and the agents 110. These operations are designed to allow efficient distribution of the SCSI state over a concise interface. In this way, the operations may be carried out remotely over any suitable network transport mechanism, such as the communication channel 132. These operations generally fall into two categories: command/response operations and fault/response operations.

Figure 4:
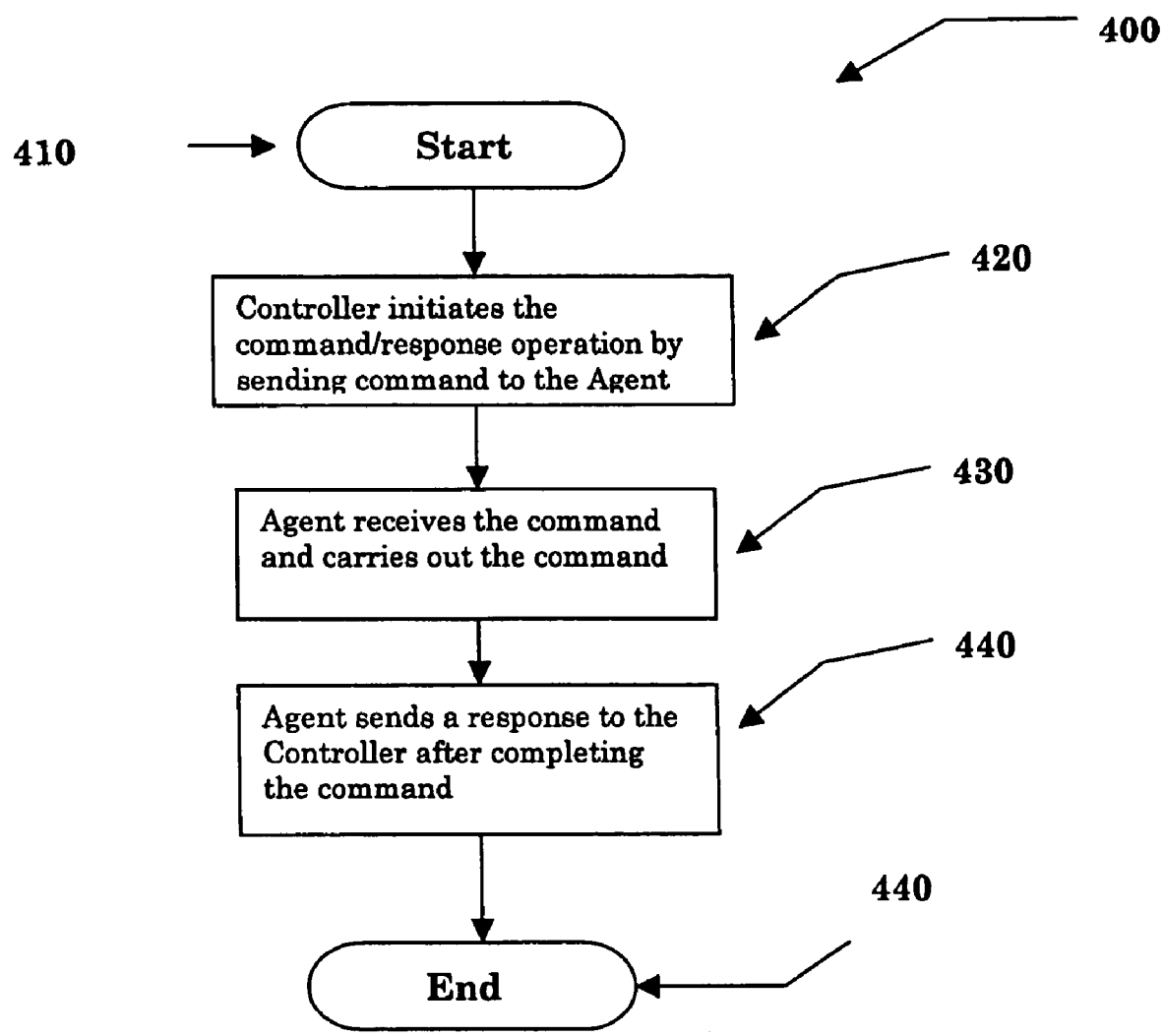
FIG. 4 is a flow chart illustrating the steps in a methodology for the command/response operations utilized in the SCSI semantics distribution system of FIGS. 1A–1C, in accordance with a preferred embodiment of the present invention.

As depicted in FIG. 4, the command/response operations commence at step 410. These operations 400 are initiated by the controller 120, step 420, and are carried out by the agents 110, step 430. Upon completion of the command, the agents 110 return a response to the controller 120, step 440, ending the command/response operation 440.

Figure 5:
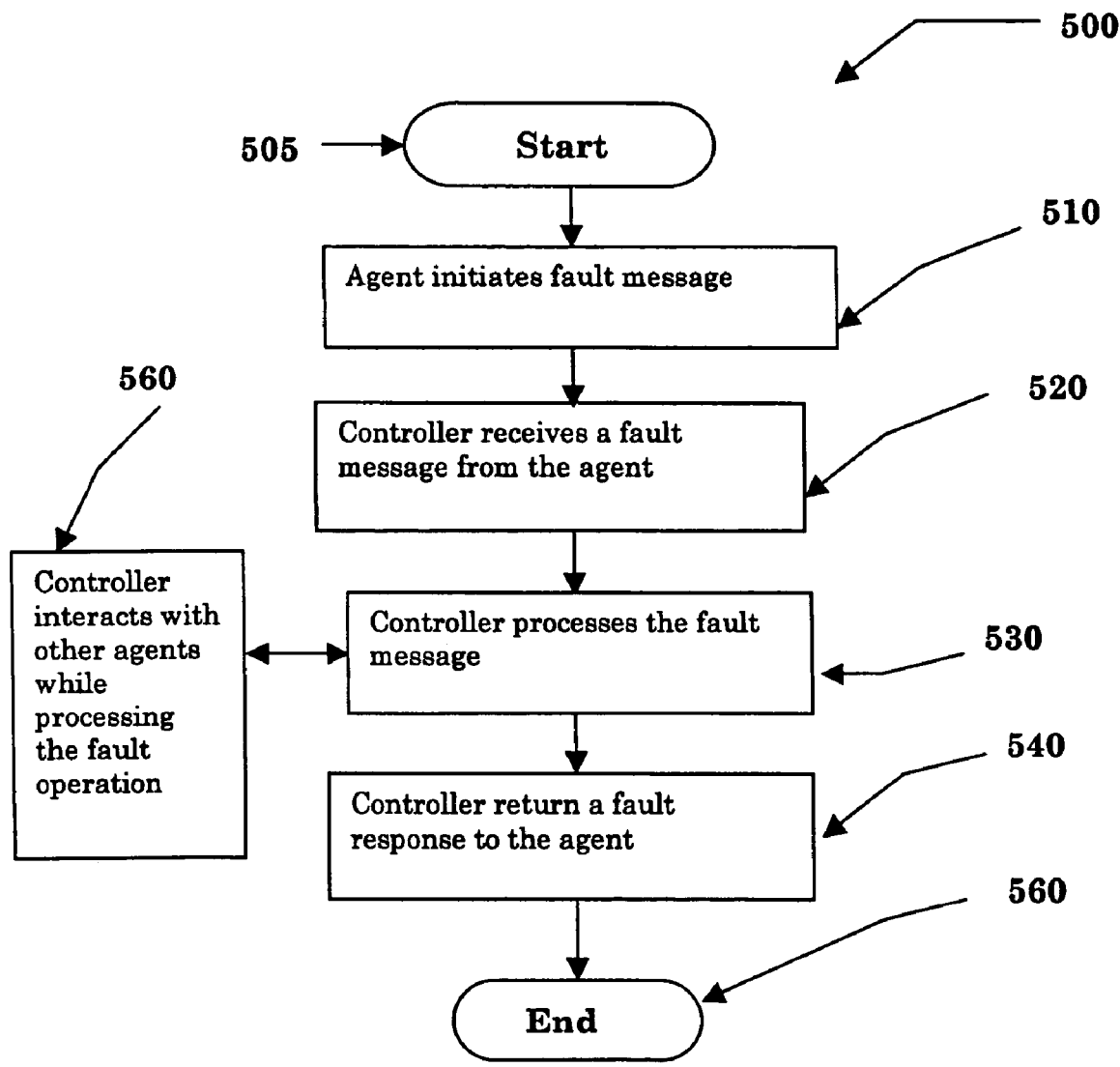
FIG. 5 is a flow chart illustrating the steps in a methodology for the fault/response operations utilized in the SCSI semantics distribution system of FIGS. 1A–1C, in accordance with a preferred embodiment of the present invention.

The fault/response process commences at step 505, as depicted in FIG. 5. In the fault/response process 500, the agents 110 initiate the fault/response operation, step 510, as the result of a SCSI operation that may change the overall SCSI semantic or state. In step 520, the agent 110 sends a fault message to the controller 120. The controller 120 processes the fault message, step 530, and returns a fault response to the mapping agent, step 540. During the step 530, the controller 120 may interact with other agents 110, using the command/response operations 400, while receiving and processing the fault operation, step 550. The process concludes in step 560.

The system 100 has numerous command/response operations 400 capable of supporting a distributed SCSI state for a virtual disk 150. For example, an abort_task_set command causes the agent 110 to perform a SCSI abort task behavior for the virtual disk 150, thereby aborting all SCSI commands in progress. An activate command causes the agent 110 to attempt to put the virtual disk 150 presentation into the active state, but the activate command may fail if other conditions or SCSI semantics prohibit the state change. A disable command causes the agent to put the virtual disk presentation into a disabled state, i.e., not allowing I/O operations on the virtual disk 150. A get_bus_target_lun command retrieves the virtual bus, target and LUN numbers of the virtual disk 150. A get_protocol_state command retrieves the values for each field of the protocol state structure for the virtual disk 150. A get_state command gets an agent 110 virtual disk state. A lun_reset command instructs the agent 110 to perform the semantics of a LUN reset operation against the virtual disk 150, thereby aborting all SCSI commands in progress, releasing non-persistent reservations, and setting the unit_attention flag 229. A quiesce command causes the agent 110 to attempt to put the virtual disk presentation into a quiesced state and to delay incoming I/O operations until the presentation is activated. The quiesce command may fail, however, if other conditions or the SCSI state prohibit this state change. The command may also fail if outstanding I/O operations do not complete within a specified time period. A set_bus_target_lun command designates a virtual bus, a target, and a LUN for the virtual disk 150. A set_protocol_state designates values for the fields of the protocol state structure 220. Similarly, a set_unit_attention command sets the unit attention Boolean attribute 229 to have a true or false value.

The system 100 may also use any of the following fault/response operations 500. A bus_reset_fault fault message allows the agent 110 to indicate to the controller 120 that the host 150 has issued a bus reset command to a conceptual bus representing a group of virtual disks 150. The agents' fault response to this message indicates that the reset processing has been completed. An io_error fault message allows the agent 110 to indicate that a mapped I/O operation to the storage container 160 has failed for some reason. An io_event fault message is used by the agent 110 to indicate that a mapped I/O operation to the storage container 160 has successfully completed, but has returned some type of additional status information. A lun_reset_fault fault message allows the agent 110 to indicate to the controller 120 that the host 150 has issued a LUN reset command to a virtual disk 150. The agent 110 fault response to the lun_reset_fault message indicates that reset processing has completed. Through a scsi_cdb_fault fault message, the agent 110 forwards to the controller 120 any SCSI commands that cannot be processed autonomously by the agent 110. The controller 120 performs the SCSI command, if possible, and returns the results of the SCSI command as a fault response. A state_change fault message allows the agent 110 to inform the controller 120 of any asynchronous state changes, i.e., changes caused by something other than a state change request from the controller 120. Through a unit_attention fault message, the agent 110 requests sense data maintained by the controller 120, which is contained in the controller 120 fault response.

The use of the fault mechanism 400 in the system 100 allows high-performance I/O operations to pass quickly through the agent 110, generally without involvement of the controller in non-faulting cases. The system 100 allows the controller 120 to insert itself into an I/O stream only when needed to perform various management operations. Thus, the controller 120 is typically not involved in the I/O operations, providing the system 100 with high performance and scalability.

Figure 6:
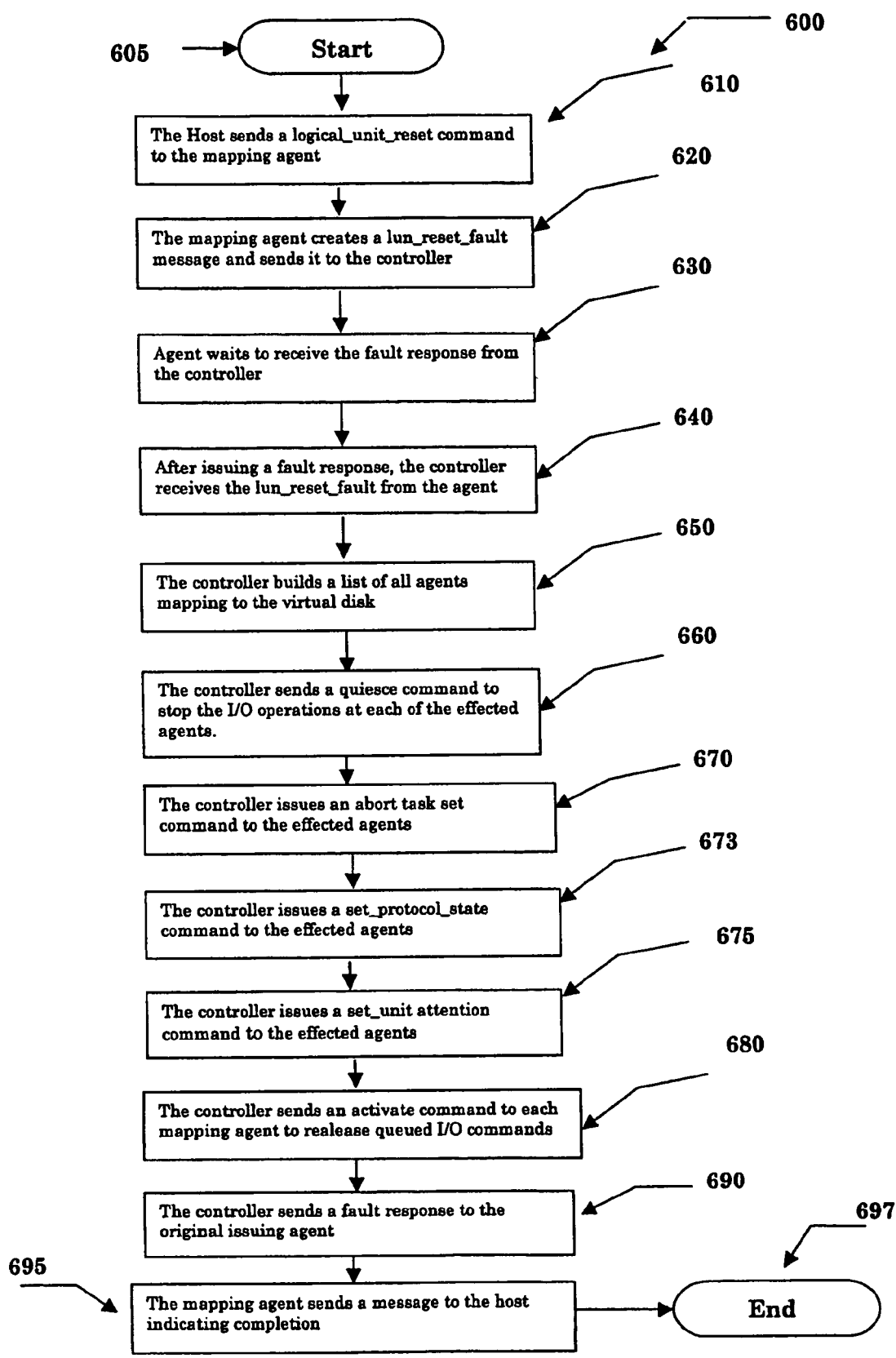
FIG. 6 is a flow chart illustrating the steps in a methodology for the LUN Reset operation utilized in the SCSI semantics distribution system of FIGS. 1A–1C, in accordance with an embodiment of the present invention.

The system 100 can further perform complex operations using some of the above-described states and interfaces. For example, a LUN Reset 600 operation, illustrated in FIG. 6, performs a reset that affects all presentations of an effected virtual disk 150. The LUN reset 600 aborts all tasks in all task sets for the virtual disk 150, clears contingent allegiance or auto-contingent allegiance conditions, releases reservations 223, sets the unit attention condition 229, and generally resets the SCSI protocol state for the presentation to an initial state. The agent 110 is generally unable to process a LUN reset 600 operation autonomously, and proceeds using the following process. In particular, the agent 110 receives a logical_unit_reset command from the host 150, step 610. The agent 110 creates a lun_reset_fault message and sends this message to the controller 120, step 620 and waits for the fault response from the controller 120, step 630. The controller 120 receives the lun_reset_fault from the agent 110, step 640, and builds a list of all the agents 110 mapping to the virtual disk 150, step 650.

The controller 120 then sends a quiesce command to stop the I/O operations at each of the effected agents 110 identified in the step 650, step 660. In step 670, the controller 120 issues an abort_task_set command to the agents 110 identified in step 650. In step 673, the controller 120 issues a set_protocol_state command to the agents 110, as needed to change the SCSI protocol state in the agents 110 identified in step 650. In step 675, the controller 120 issues a set_unit_attention command to the agents 110 identified in step 650 to set the unit_attention SCSI state 229. The actions of the steps 670–673 may be done in parallel for each of the agents 110 identified in step 650, after the quiesce in step 660 has completed for all involved agents 110. In step 680, the controller 120 sends an activate command to each of the agents 110 to release quiesced I/O operations identified in step 650. The controller 120 then sends a fault response to the original issuing agent 110, step 690. In response, the agent 110 sends a message to the host 140 indicating the completion the LUN Reset operation, step 695. The operation concludes at step 697.

Figure 7:
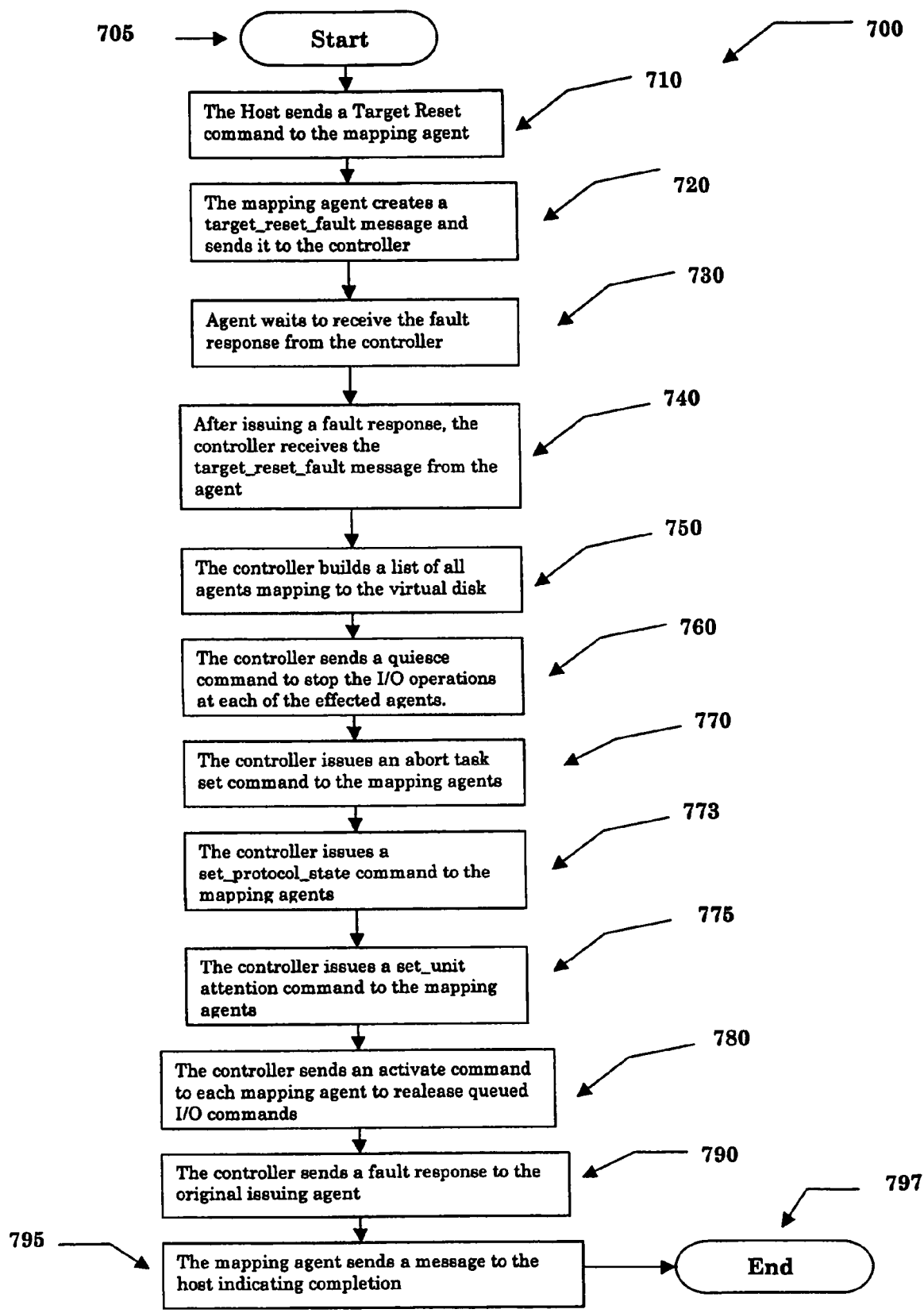
FIG. 7 is a flow chart illustrating the steps in a methodology for the Target Reset operation utilized in the SCSI semantics distribution system of FIGS. 1A–1C, in accordance with an embodiment of the present invention.

In another complex operation, the Target Reset operation 700 as illustrated in FIG. 7, the system 100 resets a grouping of virtual disks, or "a Target." The Target Reset operation 700 commences at step 705. The operation then proceeds as follows. In step 710, an agent 110 receives a Target Reset command 700 from the host 150. In response, the agent 110 creates a target_reset_fault message and sends this fault message to the controller 120, step 720. The agent 110 then waits for the fault response from the controller 120, step 730. The controller 120 receives the target_reset_fault message from the agent 110, step 740, and builds a list of each virtual disk 150 that is to be reset and is associated with the target, step 750. In particular, the controller 120 identifies each agent that maps to the virtual disks 150 in the target.

In step 760, the controller 120 sends a quiesce command to stop I/O operations to each of the virtual disks presentations associated with the target on each of the agents 110 containing those presentations. In step 770, the controller 120 issues an abort_task_set command to the agents 110 identified in step 750. In step 773, the controller 120 issues a set_protocol_state command to the agents 110 identified in the step 750 as needed to change the SCSI protocol states in those agents 110. Further, in step 775, the controller 120 issues a set_unit_attention command to the agents 110 identified in step 750 to set the unit_attention SCSI state. The actions of the steps 770–775 may be done in parallel for each of the agents 110 identified in the step 750, once the quiesce in step 760 has completed for all involved agents 110. The controller 120 sends to each of the agents 110 accessing the target an activate command to release queued I/O operations, step 780. The controller 120 then sends a fault response to the agent 110 that received the original Target Reset operation command in step 710, step 790. The agent 150 that received the original Target Reset command 110 completes the Target Reset operation 700 by issuing a message to the host 150, step 795. The Target Reset operation 700 concludes at step 797.

As may be seen, the system 100 processes a Target Reset 700 very similarly to the LUN Reset 700 except that the Target Reset 700 resets a group of virtual LUNS. The key difference is that the quiesce operation is performed on all affected virtual disks 150 before any other state is changed.

Figure 8:
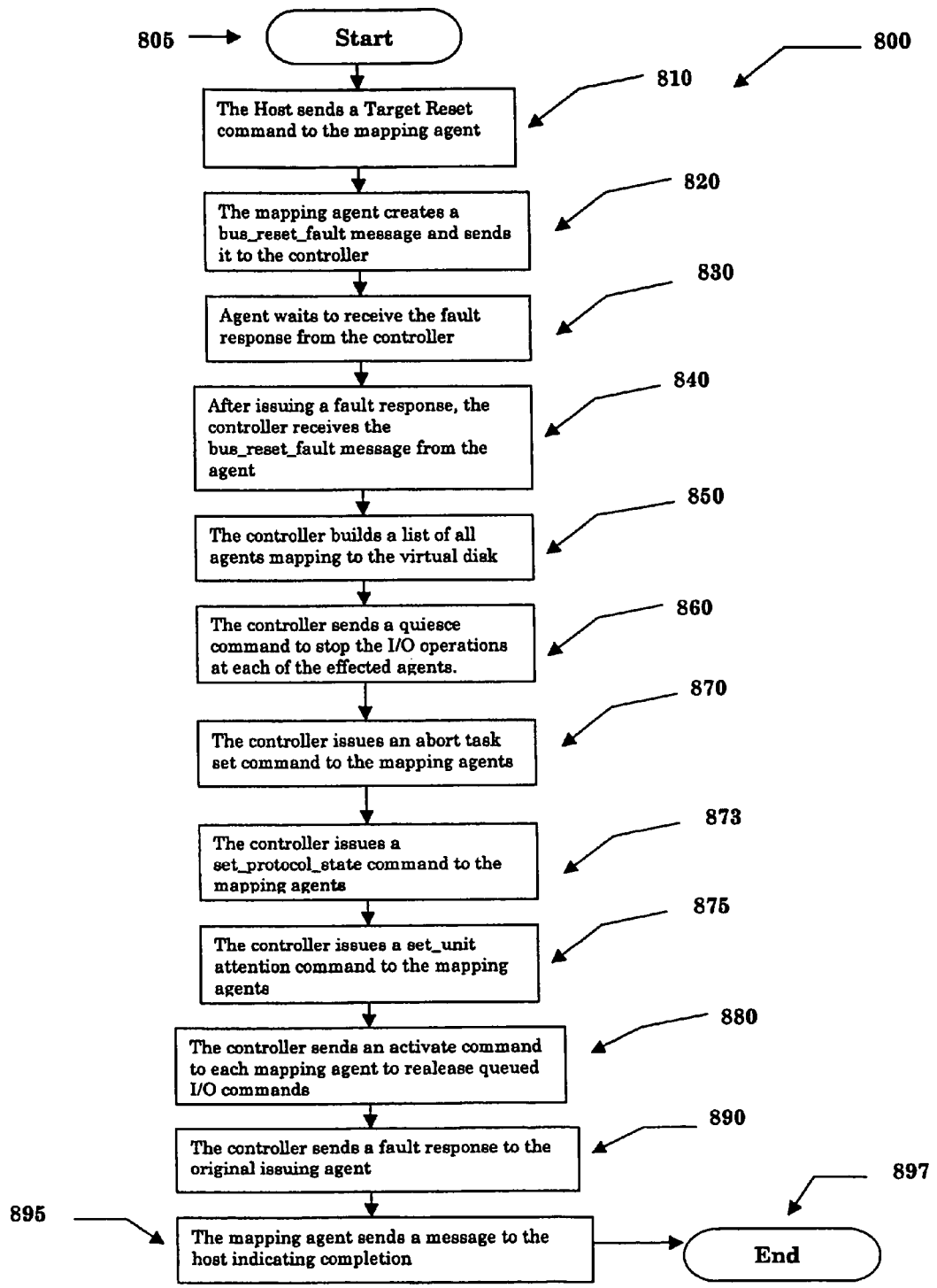
FIG. 8 is a flow chart illustrating the steps in a methodology for the Bus Reset operation utilized in the SCSI semantics distribution system of FIGS. 1A–1C, in accordance with an preferred embodiment of the present invention.

Another complex operation on the system 100 is a Bus Reset operation 800, as depicted in FIG. 8. As described above, a Bus is a grouping of targets. This command resets all of the virtual disks that comprise the Bus. As in LUN and Target Resets 600 and 700, the Bus Reset operation 800 begins when a host directs an agent 110 to reset a bus, step 810. The agent 110 responds by creating and sending to the controller 120 a bus_reset_fault, step 820. The agent 110 then waits for a fault response from the controller 120, step 830. In the interim, the controller 120 receives the bus_reset_fault from the agent 110, and identifies each agent 110 that presents the virtual disks 150 included in a group of targets that are combined to define the Bus, step 840.

The controller 120, for each of the agents 110 identified in step 850, then sends a quiesce command to stop all I/Os operations. In step 870, the controller 120 issues an abort_task_set command to the identified agents 110. In step 873, the controller 120 issues a set_protocol_state command to the identified agents 110, as needed to change the SCSI protocol state in those agents 110. Further, in step 875, the controller 120 issues a set_unit_attention command to the identified agents 110 to set the unit_attention SCSI state. The actions of the steps 870–875 may be done in parallel for each of the identified agents 110, once the quiesce in step 860 has completed to all involved agents 110. Upon completion of step 870, the controller 120 sends an activate command to release queued I/O operations to each agent 110 receiving the quiesce command, step 880, and sends a fault response to the originating agent 110 from step 820, step 890. The originating agent 110 from step 810 completes the Bus Reset operation 800 by issuing a message to the host 140, step 895. The Bus Reset operation concludes in step 897.

As with the Target Reset 700, the Bus Reset 800 is very similar to a LUN Reset 600, except that the Bus Reset 800 affects a potentially wider scope of agents 110. Again, the quiesce operation is performed on all effected agents 110 before any other state is changed to provide atomic behavior. It should be appreciated that states, commands, and faults may be combined to produce numerous other complex processes, as needed for the operation of the system 100 or an associated virtual storage network.

One difficulty in implementing the distributed SCSI system 100 is the problem of continuing to provide service when a component and/or a communication link fails. For example, it may be necessary where a single virtual disk 150 is presented through multiple agents 110 to continue providing service after one of the mapping agents 110 or connection to the mapping agent 110 fails.

Figure 9:
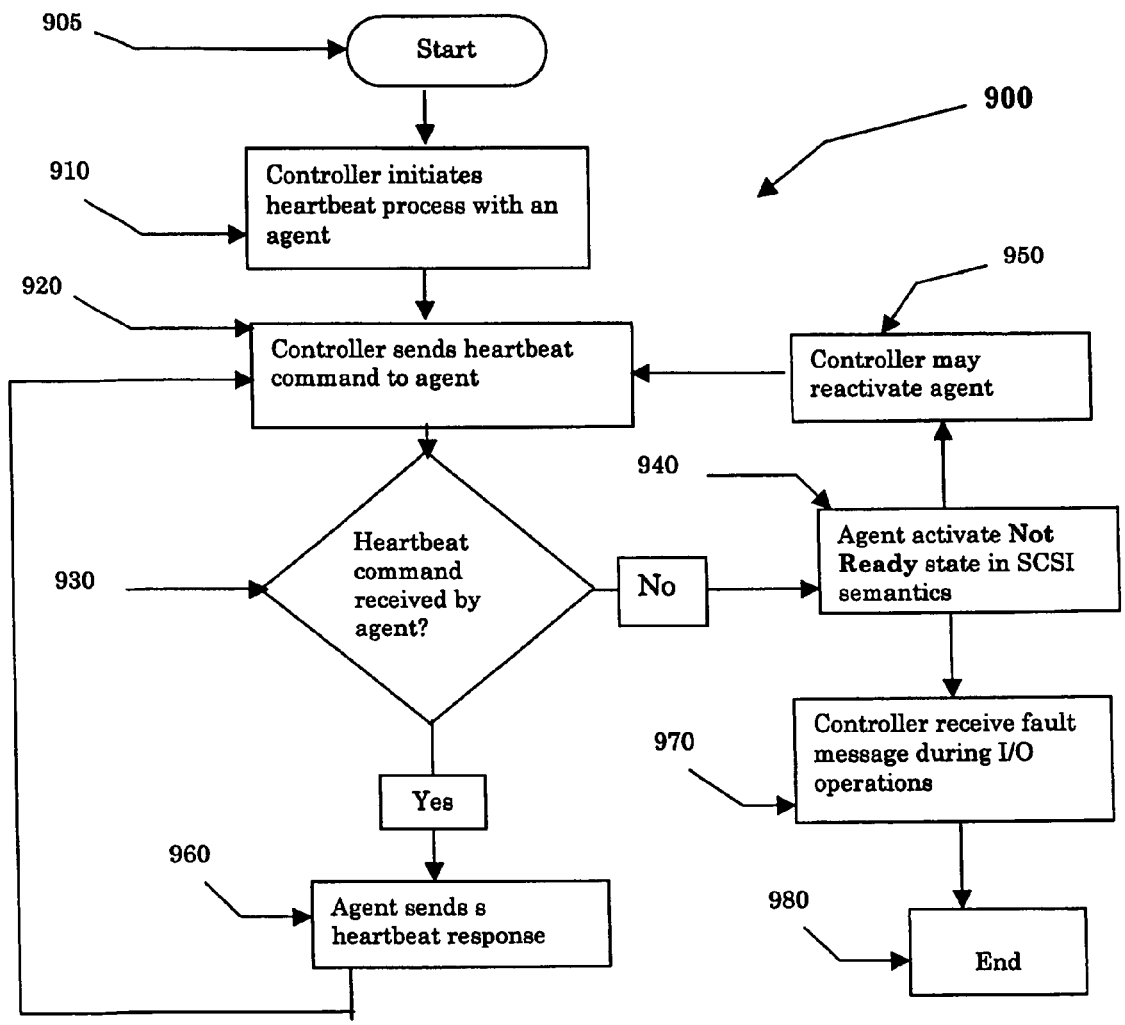
FIG. 9 is a flow chart illustrating the steps in a heartbeat process in accordance with an embodiment of the present invention.

To address this need, another embodiment of the system 100 implements a "heartbeat" process 900 to detect failure and to revert to known states in case of the failure of any of the components in the system 100, as depicted in FIG. 9 and starting at step 905. To quickly summarize this embodiment, an interface is established to deliver heartbeat messages. Failure to receive the heartbeat message causes specific state changes to the agent 110 that are known by the controller 120 even when a connection fails and is not available. A set_heartbeat command allows the controller 120 to tell the agent 110 to start the heartbeat process step 910. This command optimally specifies the heartbeat interval. Typically, this interval is on the order of several of seconds. After the controller 120 has issued the set_heartbeat command, the controller 120 further issues a heartbeat command to send a signal to the agent 110, step 920. The heartbeat signal may have any format or structure as long as it is sufficient to indicate the presence of a working connection. During step 930, the agent waits for the heartbeat command. During normal operation, the agent generally receives repeated heartbeat signals, where each heartbeat signal is separated by less than the heartbeat interval specified in the set_heartbeat command. The agent then responds to the heartbeat command, step 960. This heartbeat command response may further return a current heartbeat state, so that lost heartbeats (i.e., failed components) causing timeouts may be quickly detected by the controller.

If the agent 110 does not receive a heartbeat signal, the SCSI semantics for the virtual disk 150 is set to a Not Ready state step 940. Preferably, the Not Ready state continues to be active in the SCSI semantics even after the agent 110 receives a subsequent heartbeat signal from the controller 120. In the preferred embodiment, the Not Ready state in the SCSI semantics is changed only by the Activate command described above, step 950. To monitor the status of the agent 110, the controller 120 may use an is_no_heartbeat command to determine the current heartbeat state of a agent 110. This command may return a true value if all heartbeats have timed out, i.e., both the agents 110 and connections are functioning.

As described above, the agent behavior is changed such that if a heartbeat is not delivered within the required interval, all virtual disk SCSI semantic settings change to Not Ready, step 940. The Not Ready state causes an error message to be delivered to the hosts 140 using the virtual disk 150, step 970. Similarly, if the agent 110 crashes and restarts, or is deliberately shut down, all virtual disks 150 mapped by the agent 110 may come up in the same Not Ready state. This feature allows the controller 120 to know, after loss of heartbeats to the agent 110 (which may be caused by a mapping agent failure or a connection failure), that the host 140 access to those virtual disks 150 has stopped and is in a known state (Not Ready) after a known period of time. The heartbeat process 900 then completes in step 980.

While the above description places the interface for the heartbeat messages on the agents, the design could easily be adapted so heartbeat interface is on an object on the agents 110 that present the virtual disks 150. In this way, the presentation of the virtual disk to the hosts 140 is altered, but the agent is otherwise unaffected.

The foregoing description of the preferred embodiments of the invention has been presented for the purposes of illustration and description. It is not intended to be exhaustive or to limit the invention to the precise form disclosed. Many modifications and variations are possible in light of the above teaching. In particular, although the present invention refers to SCSI semantics, it should be appreciated that the system 100 may be applied to transport and distribute semantics in other non-SCSI protocol systems for use in a distributed virtual storage system. It is intended that the scope of the invention be limited not by this detailed description, but rather by the claims appended hereto. The above specification, examples and data provide a complete description of the manufacture and use of the composition of the invention. Since many embodiments of the invention may be made without departing from the spirit and scope of the invention, the invention resides in the claims hereinafter appended.

What is claimed is:

1. A SCSI semantics distribution system for a distributed control virtual storage network comprising:
   a storage network controller;
   one or more hosts connected via one or more paths via one or more mapping agents to said storage network controller and one or more storage devices;
   said storage network controller having stored within it a data structure that represents one or more virtual disks in a storage device;
   wherein said controller stores SCSI semantics and distributes portions of the SCSI semantics to the mapping agents for storage in volatile memory such that virtual disks are presented to multiple hosts through multiple mapping agents, and wherein
   an agent stores a first copy of the SCSI semantic, and
   the controller stores a second copy of the SCSI semantics, said controller intermittently causing contents of the first copy of the SCSI semantics in an agent to be replaced by contents of the second copy in the controller.

2. The SCSI semantics distribution system of claim 1, wherein
   a single virtual disk is presented to a plurality of mapping agents for storage operations.

3. The SCSI semantics distribution system of claim 1, wherein
   the virtual disks are exposed to one or more hosts over multiple paths via one or more agents to cause the virtual disks to appear to the hosts as SCSI disks using SCSI semantics.

4. The SCSI semantics distribution system of claim 1, wherein
   communication between the controller and the agents is over a communication channel.

5. The SCSI semantics distribution system of claim 4, wherein
   the communication channel is part of the storage network.

6. The SCSI semantics distribution system of claim 4, wherein
   the communication channel employs an established data transfer protocol between the controller and the agents.

7. The SCSI semantics distribution system of claim 1, wherein
   the controller stores a task state in the SCSI semantic.

8. The SCSI semantics distribution system of claim 1, wherein
   each of the one or more agents are configured to contain a separate and independent task state.

9. The SCSI semantics distribution system of claim 1, wherein
   one or more agents share a virtual disk through common mapping to a storage device and share a task state to coordinate changes to the virtual disk.

10. The SCSI semantics distribution system of claim 1, wherein
    the controller monitors changes in the SCSI semantics and updates the second copy of the SCSI semantics according to the changes.

11. The SCSI semantics distribution system of claim 10, wherein
    the controller transfers changes in the second copy of the SCSI semantics to the first copy of the SCSI semantics in an agent.

* * * * *